(12) United States Patent
Baseman et al.

(10) Patent No.: US 9,915,942 B2
(45) Date of Patent: Mar. 13, 2018

(54) SYSTEM AND METHOD FOR IDENTIFYING SIGNIFICANT AND CONSUMABLE-INSENSITIVE TRACE FEATURES

(71) Applicant: International Business Machines Corporation, Armonk, NY (US)

(72) Inventors: Robert J. Baseman, Brewster, NY (US); Amit Dhurandhar, Yorktown Heights, NY (US); Fateh A. Tipu, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 14/663,628

(22) Filed: Mar. 20, 2015

(65) Prior Publication Data

US 2016/0274177 A1   Sep. 22, 2016

(51) Int. Cl.
*G01R 31/26* (2014.01)
*G05B 19/418* (2006.01)

(52) U.S. Cl.
CPC .......... *G05B 19/41875* (2013.01); *G05B 2219/32187* (2013.01); *G05B 2219/45031* (2013.01); *Y02P 90/22* (2015.11)

(58) Field of Classification Search
CPC ... H01L 22/20; H01L 21/67288; H01L 22/26; Y02P 90/22; Y02P 90/26; Y02P 90/14; Y02P 90/20; G02B 2219/45031; G02B 19/41875; G02B 2219/32194; G02B 13/048; G02B 2219/32182; G02B 2219/32187

USPC .... 700/108, 121, 110, 109; 702/182, 81, 84, 702/123, 179, 183
See application file for complete search history.

(56) References Cited

U.S. PATENT DOCUMENTS

| | | | |
|---|---|---|---|
| 6,374,197 | B1 | 4/2002 | Ganesh et al. |
| 7,072,049 | B2 | 7/2006 | Niu et al. |
| 7,151,976 | B2* | 12/2006 | Lin .................... G05B 19/4184 700/108 |
| 7,539,585 | B2 | 5/2009 | Baseman et al. |
| 7,650,251 | B2 | 1/2010 | Baseman et al. |
| 7,962,302 | B2 | 6/2011 | Baseman et al. |
| 8,285,409 | B2 | 10/2012 | Ghosh et al. |
| 8,285,414 | B2 | 10/2012 | Aharoni et al. |
| 8,315,729 | B2 | 11/2012 | Baseman et al. |
| 8,328,950 | B2 | 12/2012 | Baseman et al. |
| 8,533,635 | B2 | 9/2013 | Baseman et al. |

(Continued)

*Primary Examiner* — David Vu
*Assistant Examiner* — Jonathan Han
(74) *Attorney, Agent, or Firm* — Edward P. Li

(57) ABSTRACT

A method, a computer program product, and a computer system for identifying significant and consumable-insensitive trace features. A computer computes a residual in a first regression of one or more secondary factors on a target. The computer computes residuals in a second regression of the one or more secondary factors on each of one or more trace features in one or more trace feature sets. The computer computes, for the one or more trace feature sets, coefficients of determination in a third regression of the residuals in the second regression on the residual in the first regression. The computer ranks the one or more trace feature sets by sorting the coefficient of determination. The computer determines, based on rankings of the one or more trace feature sets, significant trace feature sets.

18 Claims, 3 Drawing Sheets

(56) References Cited

U.S. PATENT DOCUMENTS

| | | |
|---|---|---|
| 8,594,821 B2 | 11/2013 | Baseman et al. |
| 8,630,962 B2 | 1/2014 | Maeda et al. |
| 8,793,106 B2 | 7/2014 | Baseman et al. |
| 2010/0017009 A1 | 1/2010 | Baseman et al. |
| 2010/0249976 A1* | 9/2010 | Aharoni ............. G05B 23/0216 700/110 |
| 2011/0276170 A1* | 11/2011 | Baseman ........... G01R 31/2894 700/110 |
| 2011/0282472 A1 | 11/2011 | Baseman et al. |
| 2012/0286953 A1 | 11/2012 | Bousamra et al. |
| 2012/0316835 A1 | 12/2012 | Maeda et al. |
| 2013/0173218 A1 | 7/2013 | Maeda et al. |
| 2014/0031969 A1* | 1/2014 | Baseman ............. G05B 13/048 700/121 |
| 2014/0107828 A1 | 4/2014 | Zhu et al. |

\* cited by examiner

SYSTEM AND METHOD FOR IDENTIFYING SIGNIFICANT AND CONSUMABLE-INSENSITIVE TRACE FEATURES

TECHNICAL FIELD OF THE INVENTION

The present invention relates generally to computer implemented analytics, and more particularly to identifying significant and consumable-insensitive trace features in semiconductor manufacture.

BACKGROUND

In semiconductor manufacture, everyday engineers want to identify trace features or sets of trace features, such as certain pressures, temperatures, gas flows, etc. Those trace features or sets of trace features cause the output of processes in semiconductor manufacture to be out-of-specification or deviated from the targets. For example, a high pressure may cause deposition of a film lower than specification. It is not uncommon to find 5 million potential trace features that need to be distinguished or ranked in a particular run by engineers.

There are many secondary factors or consumables, such as temporal drifts, age of equipment, wearing of polishing pads, environmental factors, and other secondary factors. Frequently, the secondary factors or consumables cause changes of both the trace features and the targets. For example, an old tool in rapid thermal processing (RTP) may have a dirty glass film or it may be fogged up requiring the lamps to consume more power and run hotter.

SUMMARY

In one aspect, a method for identifying significant and secondary-factor-insensitive trace features is provided. The method is implemented by a computer. The method includes computing a residual in a first regression of one or more secondary factors on a target. The method further includes computing residuals in a second regression of the one or more secondary factors on each of one or more trace features in one or more trace feature sets. The method further includes computing, for the one or more trace feature sets, coefficients of determination in a third regression of the residuals in the second regression on the residual in the first regression. The method further includes ranking the one or more trace feature sets by sorting the coefficient of determination. The method further includes determining, based on rankings of the one or more trace feature sets, significant trace feature sets.

In another aspect, a computer program product for identifying significant and secondary-factor-insensitive trace features is provided. The computer program product comprises a computer readable storage medium having program code embodied therewith. The program code is executable to: compute a residual in a first regression of one or more secondary factors on a target; compute residuals in a second regression of the one or more secondary factors on each of one or more trace features in one or more trace feature sets; compute for the one or more trace feature sets, coefficients of determination in a third regression of the residuals in the second regression on the residual in the first regression; rank the one or more trace feature sets by sorting the coefficient of determination; and determine significant trace feature sets, based on rankings of the one or more trace feature sets.

In yet another aspect, a computer system for identifying significant and secondary-factor-insensitive trace features is provided. The computer system comprises one or more processors, one or more computer readable tangible storage devices, and program instructions stored on at least one of the one or more computer readable tangible storage devices for execution by at least one of the one or more processors. The program instructions are executable to compute a residual in a first regression of one or more secondary factors on a target. The program instructions are further executable to compute residuals in a second regression of the one or more secondary factors on each of one or more trace features in one or more trace feature sets. The program instructions are further executable to compute for the one or more trace feature sets, coefficients of determination in a third regression of the residuals in the second regression on the residual in the first regression. The program instructions are further executable to rank the one or more trace feature sets by sorting the coefficient of determination. The program instructions are further executable to determine, based on rankings of the one or more trace feature sets, significant trace feature sets.

DETAILED DESCRIPTION

Embodiments of the present invention disclose a method for solving a novel problem in semiconductor manufacture. The method is used to identify and rank significant trace features or sets of trace features, based on the information trace features carry over about the target measurements and above correlations based on secondary factors or consumables. The trace features or sets of trace features may cause the output of processes in semiconductor manufacture to be out-of-specification or deviated from the targets. The trace features include but not limited to certain pressures, temperatures, and gas flows. The secondary factors or consumables, such as temporal drifts, age of equipment, wearing of polishing pads, environmental factors, and other such secondary factors (consumables), may cause changes of both the trace features and the targets. In such a scenario, the method of the present invention devalues correlations between the trace features and the target, because they are not true causal relationships and both the trace features and target are affected by the secondary factors or consumable.

Figure 1A:
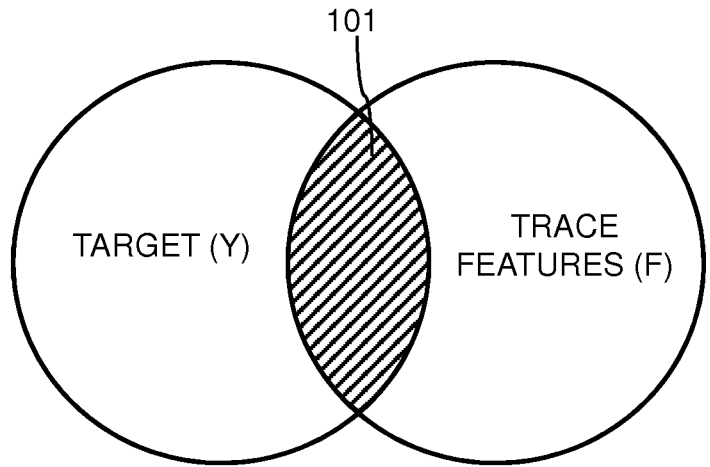
FIG. 1A and FIG. 1B show Venn diagrams presenting intuitive explanations of current methods and the method of the present invention, in accordance with one embodiment of the present invention.
Figure 1B:
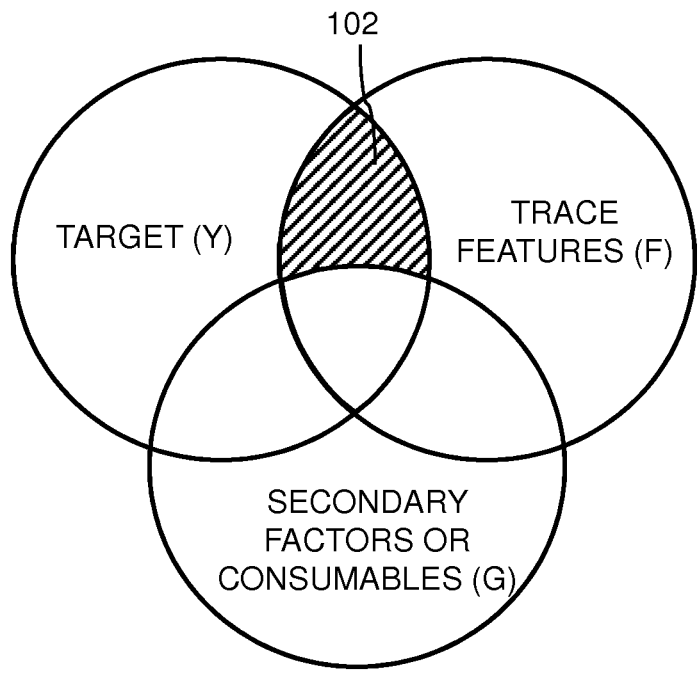

FIG. 1A and FIG. 1B show Venn diagrams presenting intuitive explanations of current methods and the method of the present invention, in accordance with one embodiment of the present invention. Shaded area 101 in the Venn diagram shown in FIG. 1A represents the information the current methods try to quantify, while shaded area 102 in the Venn diagram shown in FIG. 1B represents the information the method of the present invention tries to quantify. As shown in FIG. 1A, the current methods try to capture the essence of the relationship between trace features F and the target Y. However, as shown in FIG. 1B, the method of the present invention tries to capture the essence of the relationship between trace features (F) and the target (Y) given secondary factors or consumables (G). In the method of the present invention, the above quantification is performed by regressing residuals of trace features (F) on the residuals of the target (Y) relative to secondary factors or consumables (G).

A simple example illustrates the difference between the method of the present invention and the current methods. In this example, it is assumed that (1) a set of the trace features (F) include $f_1$ and $f_2$: $F=\{f_1, f_2\}$, (2) a set of the secondary factors or consumables (G) includes g: $G=\{g\}$, and (3) the target is Y. Let $f_1=g$ and a correlation coefficient between $f_1$ and Y is equal to 1 ($\text{corr}(f_1, Y)=1$). Let $f_2$ be different from g and a correlation coefficient between $f_2$ and Y is equal to 0.9 ($\text{corr}(f_2, Y)=0.9$). Under these conditions, current methods and the method of the present invention render different ranks of the trace features. With current methods, $f_1$ is more significant trace feature than $f_2$; however, with the method of the present invention, $f_2$ is more significant trace feature than $f_1$.

Figure 2:
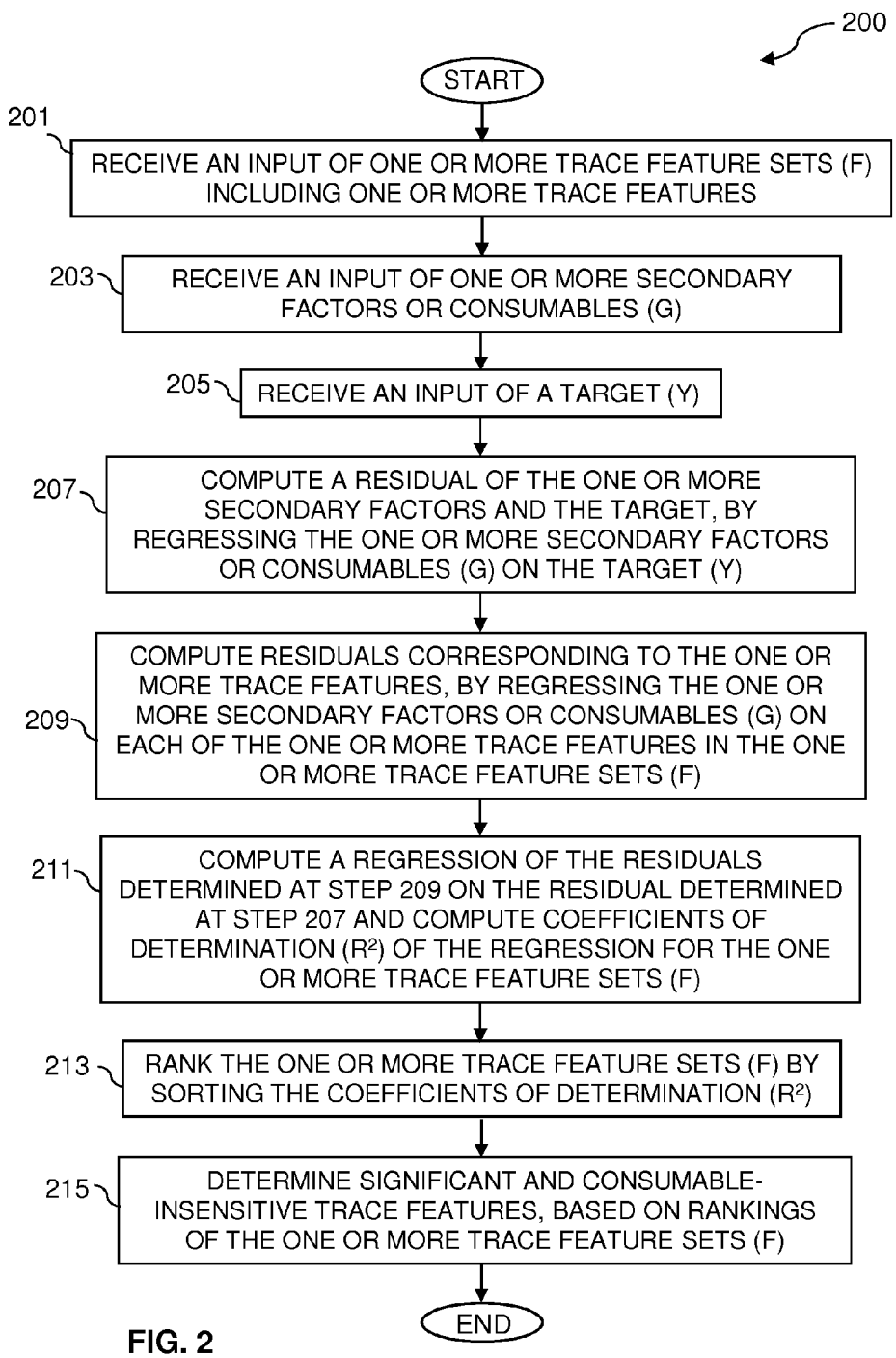
FIG. 2 is a flowchart showing operational steps for identifying significant and consumable-insensitive trace features, in accordance with one embodiment of the present invention.

FIG. 2 is flowchart 200 showing operational steps for identifying significant and consumable-insensitive trace features, in accordance with one embodiment of the present invention. The operational steps are implemented by one or more computer programs residing on computer device 300 shown in FIG. 3, which will be discussed in detail in later paragraphs of this document.

At step 201, the one or more computer programs receive an input of one or more trace feature sets (F). The one more trace feature sets (F) includes one or more trace features. The one or more trace feature sets (F) are written as follows:

$F=\{\{f_{1,1}, f_{1,2}, \ldots\}, \{f_{2,1}, f_{2,2}, \ldots\}, \ldots, \{f_{n,1}, f_{n,2}, \ldots\}\}$ where the one or more trace feature sets (F) includes n sets, a respective one of the sets includes a certain number of the trace features, $f_{1,1}$ is a first trace feature of the first set, $f_{1,2}$ is a second trace feature of the first set, $f_{2,1}$ is a first trace feature of the second set, $f_{2,2}$ is a second trace feature of the second set, $f_{n,1}$ is a first trace feature of the n-th set, and $f_{n,2}$ is a second trace feature of the n-th set. For example, the trace features include certain pressures, temperatures, gas flows, etc At step 203, the one or more computer programs receive an input of one or more secondary factors or consumables (G). The one or more secondary factors or consumables (G) can be written as:

$G=\{g_1, g_2, \ldots\}$ where the one or more secondary factors or consumables (G) includes a first secondary factor or consumable $g_1$, a second secondary factor or consumable $g_2$, and so on. For example, the one or more secondary factors or consumables includes temporal drifts, age of equipment, wearing of polishing pads, environmental factors, and other such secondary factors (consumables)

At step 205, the one or more computer programs receive an input of a target or measurement (Y). The target or measurement is a predetermined specification of a semiconductor manufacturing process.

At step 207, the one or more computer programs compute a residual of the one or more secondary factors or consumables (G) and the target (Y), by regressing the one or more secondary factors or consumables (G) on the target. At this step, the one or more computer programs compute information in the target (Y) that cannot be modeled by the one or more secondary factors or consumables (G). The residual of the one or more secondary factors or consumables (G) and the target (Y) can be denoted by $r_{G,Y}$.

At step 209, the one or more computer programs compute residuals corresponding to the one or more trace features, by regressing the one or more secondary factors or consumables (G) on each of the one or more trace features in the one or more trace feature sets (F). At this step, the one or more computer programs compute extra information in the one or more trace feature sets (F) that cannot be modeled by the one or more secondary factors or consumables (G). The residuals corresponding to the one or more trace features can be written as follows:

$\{\{r_{G,f_{1,1}}, r_{G,f_{1,2}}, \ldots\}, \{r_{G,f_{2,1}}, r_{G,f_{2,2}}, \ldots\}, \ldots, \{r_{G,f_{n,1}}, r_{G,f_{n,2}}, \ldots\}\}$ where $\{r_{G,f_{1,1}}, r_{G,f_{1,2}}, \ldots\}$ denotes a set of residuals corresponding to $\{f_{1,1}, f_{1,2}, \ldots\}$ which is the first set of the one or more trace feature sets (F), $\{r_{G,f_{2,1}}, r_{G,f_{2,2}}, \ldots\}$ denotes a set of residuals corresponding to $\{f_{2,1}, f_{2,2}, \ldots\}$ which is the second set of the one or more trace feature sets (F), and $\{r_{G,f_{n,1}}, r_{G,f_{n,2}}, \ldots\}$ denotes a set of residuals corresponding to $\{f_{n,1}, f_{n,2}, \ldots\}$ which is the n-th set of the one or more trace feature sets (F).

At step 211, the one or more computer programs compute a regression of the residuals determined at step 209 on the residual determined at step 207 and compute coefficients of determination ($R^2$) of the regression for the one or more trace feature sets (F). At this step, a set of $R^2$ including n coefficients of determination are obtained. The n coefficients of determination are corresponding to the one or more trace feature sets (F), respectively. The set of $R^2$ can be written as follows:

$R^2=\{(R^2)_1, (R^2)_2, \ldots, (R^2)_n\}$ where $(R^2)_1$ denotes a coefficient of determination corresponding to $\{f_{1,1}, f_{1,2}, \ldots\}$ which is the first set of the one or more trace feature sets (F), $(R^2)_2$ denotes a coefficient of determination corresponding to $\{f_{2,1}, f_{2,2}, \ldots\}$ which is the second set of the one or more trace feature sets (F), and $(R^2)_n$ denotes a coefficient of determination corresponding to $\{f_{n,1}, f_{n,2}, \ldots\}$ is the n-th set of the one or more trace feature sets (F). At this step, the one or more computer programs compute how much information the one or more trace feature sets (F) have about the target (Y) beyond the one or more secondary factors or consumables (G). If a value of a coefficient of determination corresponding to a trace feature set is higher, the trace feature set is more significant.

At step 213, the one or more computer programs rank the one or more trace feature sets (F) by sorting the n coefficients of determination $((R^2)_1, (R^2)_2, \ldots, (R^2)_n)$. The n coefficients of determination $((R^2)_1, (R^2)_2, \ldots, (R^2)_n)$ can be, for example, sorted in a descending order in which the one or more trace feature sets are ranked from high significance to low significance. At step 215, the one or more computer programs determine significant and consumable-insensitive trace features, based on rankings of the one or more trace feature sets (F).

Figure 3:
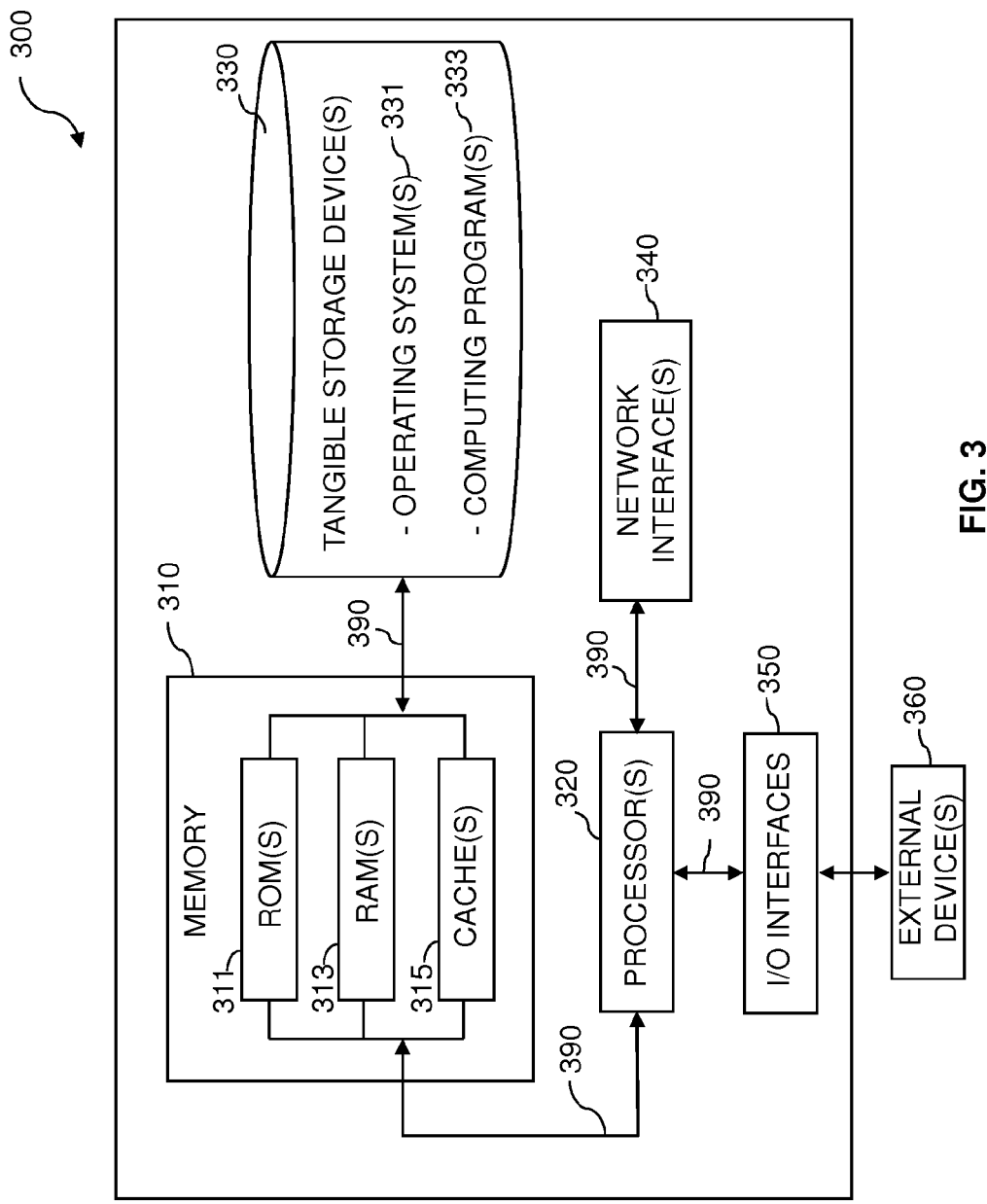
FIG. 3 is a diagram illustrating components of a computer device hosting a computer program for identifying significant and consumable-insensitive trace features, in accordance with one embodiment of the present invention.

FIG. 3 is a diagram illustrating components of computer device 300 hosting a computer program for identifying significant and consumable-insensitive trace features, in accordance with one embodiment of the present invention. It should be appreciated that FIG. 3 provides only an illustration of one implementation and does not imply any limitations with regard to the environment in which different embodiments may be implemented.

Referring to FIG. 3, computer device 300 includes processor(s) 320, memory 310, and tangible storage device(s) 330. In FIG. 3, communications among the above-mentioned components of computing device 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330. The computer program for identifying significant consumable-insensitive trace features resides on one or more computer readable tangible storage device(s) 330. Computing device 300 further includes I/O interface(s) 350. I/O interface(s) 350 allows for input and output of data with external device(s) 360 that may be connected to computing device 300. Computing device 300 further includes network interface(s) 340 for communications between computing device 300 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the FIGs illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for identifying significant and secondary-factor-insensitive trace features in a semiconductor manufacturing process, the method comprising:

computing, by a computer, a residual in a first regression of one or more secondary factors in the semiconductor manufacturing process on a target in the semiconductor manufacturing process, wherein the one or more secondary factors cause changes of one or more trace features in the semiconductor manufacturing process and the target, wherein the target is a predetermined specification of the semiconductor manufacturing process;

computing, by the computer, residuals in a second regression of the one or more secondary factors on each of one or more trace features in one or more trace feature sets, wherein the one or more trace features cause outputs of processes in the semiconductor manufacture deviated from the target;

computing, by the computer, for the one or more trace feature sets, coefficients of determination in a third regression of the residuals in the second regression on the residual in the first regression;

ranking, by the computer, the one or more trace feature sets, by sorting the coefficient of determination; and determining, by the computer, significant trace feature sets in the semiconductor manufacture, based on rankings of the one or more trace feature sets.

2. The method of claim 1, further comprising:
regressing, by the computer, the one or more secondary factors on the target.

3. The method of claim 1, further comprising:
regressing, by the computer, the one or more secondary factors on the each of the one or more trace features in the one or more trace feature sets.

4. The method of claim 1, further comprising:
regressing, by the computer, the residuals in the second regression on the residual in the first regression.

5. The method of claim 1, further comprising:
receiving, by the computer, an input of the one or more trace feature sets;
receiving, by the computer, an input of the one or more secondary factors; and
receiving, by the computer, an input of the target.

6. The method of claim 1, wherein the one or more trace features includes at least one of pressures, temperatures, and gas flows, wherein the one or more secondary factors include at least one of temporal drifts, age of equipment, wearing of polishing pads, and environmental factors.

7. A computer program product for identifying significant and secondary-factor-insensitive trace features in a semiconductor manufacturing process, the computer program product comprising a computer readable storage medium having program code embodied therewith, the program code executable to:

compute a residual in a first regression of one or more secondary factors in the semiconductor manufacturing process on a target in the semiconductor manufacturing process, wherein the one or more secondary factors cause changes of one or more trace features in the semiconductor manufacturing process and the target, wherein the target is a predetermined specification of the semiconductor manufacturing process;

compute residuals in a second regression of the one or more secondary factors on each of one or more trace features in one or more trace feature sets, wherein the one or more trace features cause outputs of processes in the semiconductor manufacture deviated from the target;

compute for the one or more trace feature sets, coefficients of determination in a third regression of the residuals in the second regression on the residual in the first regression;

rank the one or more trace feature sets, by sorting the coefficient of determination; and determine significant trace feature sets in the semiconductor manufacture, based on rankings of the one or more trace feature sets.

8. The computer program product of claim 7, further comprising the program code executable to:
regress the one or more secondary factors on the target.

9. The computer program product of claim 7, further comprising the program code executable to:
regress the one or more secondary factors on the each of the one or more trace features in the one or more trace feature sets.

10. The computer program product of claim 7, further comprising the program code executable to:
regress the residuals in the second regression on the residual in the first regression.

11. The computer program product of claim 7, further comprising the program code executable to:
receive an input of the one or more trace feature sets;
receive an input of the one or more secondary factors; and
receive an input of the target.

12. The computer program product of claim 7, wherein the one or more trace features includes at least one of pressures, temperatures, and gas flows, wherein the one or more secondary factors include at least one of temporal drifts, age of equipment, wearing of polishing pads, and environmental factors.

13. A computer system for identifying significant and secondary-factor-insensitive trace features in a semiconductor manufacturing process, the computer system comprising:
one or more processors, one or more computer readable tangible storage devices, and program instructions stored on at least one of the one or more computer readable tangible storage devices for execution by at least one of the one or more processors, the program instructions executable to:

compute a residual in a first regression of one or more secondary factors in the semiconductor manufacturing process on a target in the semiconductor manufacturing process, wherein the one or more secondary factors cause changes of one or more trace features in the semiconductor manufacturing process and the target, wherein the target is a predetermined specification of the semiconductor manufacturing process;

compute residuals in a second regression of the one or more secondary factors on each of one or more trace features in one or more trace feature sets, wherein the one or more trace features cause outputs of processes in the semiconductor manufacture deviated from the target;

compute for the one or more trace feature sets, coefficients of determination in a third regression of the residuals in the second regression on the residual in the first regression;

rank the one or more trace feature sets, by sorting the coefficient of determination; and determine significant trace feature sets in the semiconductor manufacture, based on rankings of the one or more trace feature sets.

14. The computer system of claim 13, further comprising the program instructions executable to:

regress the one or more secondary factors on the target.

15. The computer system of claim 13, further comprising the program instructions executable to:

regress the one or more secondary factors on the each of the one or more trace features in the one or more trace feature sets.

16. The computer system of claim 13, further comprising the program instructions executable to:

regress the residuals in the second regression on the residual in the first regression.

17. The computer system of claim 13, further comprising the program instructions executable to:

receive an input of the one or more trace feature sets;

receive an input of the one or more secondary factors; and receive an input of the target.

18. The computer system of claim 13, wherein the one or more trace features includes at least one of pressures, temperatures, and gas flows, wherein the one or more secondary factors include at least one of temporal drifts, age of equipment, wearing of polishing pads, and environmental factors.

* * * * *